United States Patent
Tian et al.

(10) Patent No.: US 11,349,596 B2
(45) Date of Patent: May 31, 2022

(54) NACK TRIGGERED OPTIMIZATION TO IMPROVE RETX RELIABILITY FOR URLLC-U

(71) Applicant: QUALCOMM Incorporated, San Diego, CA (US)

(72) Inventors: Qingjiang Tian, San Diego, CA (US); Srinivas Yerramalli, San Diego, CA (US); Xiaoxia Zhang, San Diego, CA (US); Jing Sun, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 457 days.

(21) Appl. No.: 16/406,637

(22) Filed: May 8, 2019

(65) Prior Publication Data
US 2019/0349121 A1   Nov. 14, 2019

Related U.S. Application Data

(60) Provisional application No. 62/669,815, filed on May 10, 2018.

(51) Int. Cl.
*H04L 1/00* (2006.01)
*H04L 5/00* (2006.01)
(Continued)

(52) U.S. Cl.
CPC .......... *H04L 1/0026* (2013.01); *H04L 5/0055* (2013.01); *H04W 24/10* (2013.01); *H04W 76/27* (2018.02); *H04W 80/02* (2013.01)

(58) Field of Classification Search
CPC ... H04L 1/0026; H04L 5/0055; H04L 5/0057; H04L 5/0091; H04L 1/1829;
(Continued)

(56) References Cited

U.S. PATENT DOCUMENTS 9,806,913 B1 * 10/2017 Kuchi ................. H04L 25/0228
2013/0121271 A1    5/2013 Chen et al.
(Continued)

OTHER PUBLICATIONS

Huawei et al., "Discussion on UCI in PUSCH on UpPTS", 3GPP TSG-RAN WG1 #86bis, 3GPP Draft; R1-1609354, 3rd Generation Partnership Project (3GPP), Mobile Competence Centre, 650, Route Des Lucioles ; F-06921 Sophia-Antipolis Cedex, France, vol. RAN WG1, No. Lisbon, Portugal; Oct. 10, 2016-Oct. 14, 2016, Oct. 1, 2016 (Oct. 1, 2016), 2 Pages, XP051159447, Retrieved from the Internet: URL: https://www.3gpp.org/ftp/tsg_ran/WG1_RL1/TSGR1_86b/Docs/ [retrieved on Oct. 1, 2016].
(Continued)

*Primary Examiner* — Ashley Shivers
(74) *Attorney, Agent, or Firm* — Liem T. Do

(57) ABSTRACT

A method of wireless communication includes determining, by a user equipment (UE) in response to a failed transmission to the UE by a base station, to transmit a negative acknowledgment (NACK). The method additionally includes transmitting, by the UE to the base station, the NACK in an acknowledgement (ACK) resource previously allocated by the base station, and triggering at least one action, by the UE in response to at least one of the determination to transmit the NACK or the transmission of the NACK. The at least one action improves retransmission success rate. In another aspect, a method of wireless communication includes receiving, by a base station from a UE, a NACK in an ACK resource previously allocated by the base station, and triggering at least one action, by the base station in response to the receipt of the NACK. The at least one action improves retransmission success rate.

26 Claims, 9 Drawing Sheets

(51) Int. Cl.
*H04W 24/10* (2009.01)
*H04W 80/02* (2009.01)
*H04W 76/27* (2018.01)

(58) Field of Classification Search
CPC .... H04L 1/1671; H04L 1/1664; H04W 24/10; H04W 80/02; H04W 76/27
See application file for complete search history.

(56) References Cited

U.S. PATENT DOCUMENTS

| | | |
|---|---|---|
| 2017/0041922 A1 | 2/2017 | Chen et al. |
| 2019/0254056 A1* | 8/2019 | Salah ..................... H04L 5/001 |
| 2020/0178144 A1* | 6/2020 | Zhou ..................... H04W 24/08 |
| 2021/0167930 A1* | 6/2021 | Jeon ..................... H04L 5/0094 |

OTHER PUBLICATIONS

International Search Report and Written Opinion—PCT/US2019/031574—ISA/EPO—dated Oct. 11, 2019.
New Postcom: "Multi-Cell HARQ-ACK and Periodic CSI Multiplexing on PUCCH Format 3",3GPP TSG-RAN WG1 #70, 3GPP Draft; R1-123355, 3rd Generation Partnership Project (3GPP), Mobile Competence Centre, 650, Route Des Lucioles ; F-06921 Sophia-Antipolis Cedex, France, vol. RAN WG1, No. Qingdao, China; Aug. 13, 2012-Aug. 17, 2012, Aug. 5, 2012 (Aug. 5, 2012), 4 Pages, XP050661239, Retrieved from the Internet: URL: https://www.3gpp.org/ftp/tsg_ran/WG1_RL1/TSGR1_70/Docs/' [retrieved on Aug. 5, 2012].
Partial International Search Report—PCT/US2019/031574—ISA/EPO—dated Aug. 16, 2019.

\* cited by examiner

NACK TRIGGERED OPTIMIZATION TO IMPROVE RETX RELIABILITY FOR URLLC-U

CROSS-REFERENCE TO RELATED APPLICATIONS

This application claims priority to U.S. Provisional Application No. 62/669,815, entitled "NACK TRIGGERED OPTIMIZATION TO IMPROVE RETX RELIABILITY FOR URLLC-U," filed May 10, 2018, the disclosure of which is incorporated herein by reference in its entirety.

TECHNICAL FIELD

Aspects of the present disclosure relate generally to wireless communication systems, and more particularly, to automatic triggering one or more actions to improve retransmission reliability in response to transmission or reception of a negative acknowledgement (NACK).

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless communication technologies not only to meet the growing demand for mobile broadband access, but to advance and enhance the user experience with mobile communications.

Ultra reliable and low latency communications (URLLC) is a new service category in 5G to accommodate emerging services and applications having stringent latency and reliability requirements, URLLC-Unlicensed (URLLC-U) extends URLLC to the unlicensed spectrum, while still allowing use of the licensed and/or shared spectrum, URLLC-U needs to satisfy strict requirements for reliability (e.g., packet loss no greater than one packet in one-million) and latency (e.g., 10 ms) even in the presence of unwanted interferers, as may be common in the unlicensed spectrum. In URLLC-U, while system design should guarantee a target success rate for the first transmission, it is desirable to significantly increase success rate for retransmission if the first transmission would fail. The present disclosure presents procedures that address this issue, but these procedures also find application in other wireless technologies, such as in-band communications.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect, a method of wireless communication includes determining, by a user equipment (UE) in response to a failed transmission to the UE by a base station, to transmit a negative acknowledgment (NACK). The method additionally includes transmitting, by the UE to the base station, the NACK in an acknowledgement (ACK) resource previously allocated by the base station. The method also includes triggering at least one action, by the UE in response to at least one of the determination to transmit the NACK or the transmission of the NACK, wherein the at least one action improves retransmission success rate.

In another aspect, an apparatus configured for wireless communication includes means for determining, by a user equipment (UE) in response to a failed transmission to the UE by a base station, to transmit a negative acknowledgment (NACK). The apparatus additionally includes means for transmitting, by the UE to the base station, the NACK in an acknowledgement (ACK) resource previously allocated by the base station. The method also includes means for triggering at least one action, by the UE in response to at least one of the determination to transmit the NACK or the transmission of the NACK, wherein the at least one action improves retransmission success rate.

In another aspect, a non-transitory computer-readable medium has program code recorded thereon. The program code includes program code executable by a computer for causing the computer to determine, by a user equipment (UE) in response to a failed transmission to the UE by a base station, to transmit a negative acknowledgment (NACK). The program code additionally includes program code executable by the computer for causing the computer to transmit by the UE to the base station, the NACK in an acknowledgement (ACK) resource previously allocated by the base station. The program code also includes program code executable by the computer for causing the computer to trigger at least one action, by the UE in response to at least one of the determination to transmit the NACK or the transmission of the NACK, wherein the at least one action improves retransmission success rate.

In another aspect, an apparatus configured for wireless communication includes at least one processor and a memory coupled to the at least one processor. The at least one processor is configured to determine, by a user equipment (UE) in response to a failed transmission to the UE by a base station, to transmit a negative acknowledgment (NACK). The at least one processor is additionally configured to transmit, by the UE to the base station, the NACK in an acknowledgement (ACK) resource previously allocated by the base station. The at least one processor is also configured to trigger at least one action, by the UE in response to at least one of the determination to transmit the NACK or the transmission of the NACK, wherein the at least one action improves retransmission success rate.

In another aspect, a method of wireless communication includes receiving, by a base station from a user equipment (UE), a negative acknowledgment (NACK) in an acknowledgement (ACK) resource previously allocated by the base station. The method additionally includes triggering at least one action, by the base station in response to the receipt of the NACK, wherein the at least one action improves retransmission success rate.

In another aspect, an apparatus configured for wireless communication includes means for receiving, by a base station from a user equipment (UE), a negative acknowledgment (NACK) in an acknowledgement (ACK) resource previously allocated by the base station. The apparatus additionally includes means for triggering at least one action, by the base station in response to the receipt of the NACK, wherein the at least one action improves retransmission success rate.

In another aspect, a non-transitory computer-readable medium has program code recorded thereon. The program code includes program code executable by a computer for causing the computer to receive, by a base station from a user equipment (UE), a negative acknowledgment (NACK) in an acknowledgement (ACK) resource previously allocated by the base station. The program code additionally includes program code executable by the computer for causing the computer to trigger at least one action, by the base station in response to the receipt of the NACK, wherein the at least one action improves retransmission success rate.

In another aspect, an apparatus configured for wireless communication includes at least one processor and a memory coupled to the at least one processor. The at least one processor is configured to receive, by a base station from a user equipment (UE), a negative acknowledgment (NACK) in an acknowledgement (ACK) resource previously allocated by the base station. The at least one processor is additionally configured to trigger at least one action, by the base station in response to the receipt of the NACK, wherein the at least one action improves retransmission success rate.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
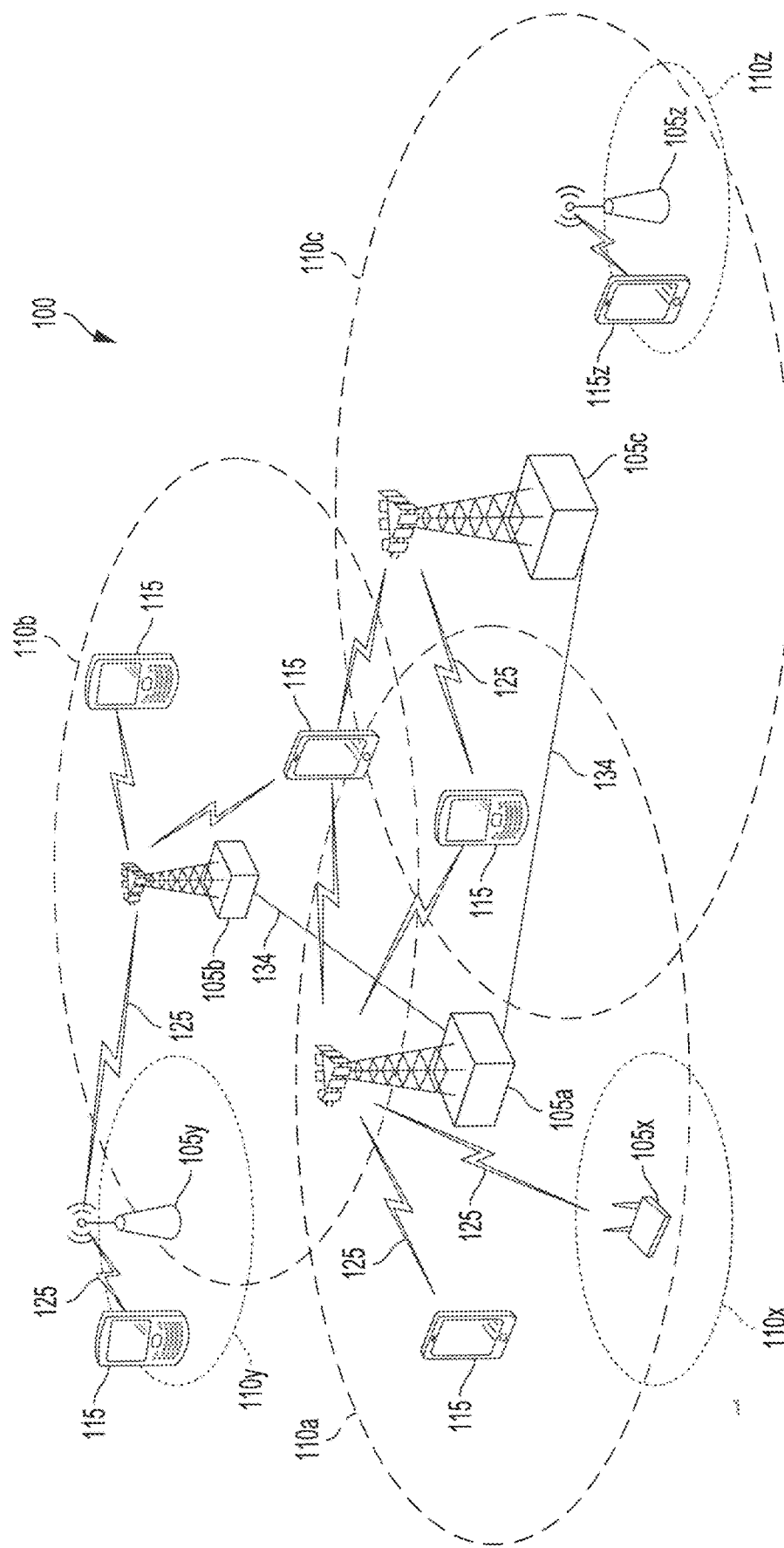
FIG. 1 is a block diagram illustrating details of a wireless communication system according to some embodiments of the present disclosure.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, long term evolution (LTE) networks, Global System for Mobile Communications (GSM) networks, as well as other communications networks. As described herein, the terms "networks" and "systems" may be used interchangeably according to the particular context.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATS) and radio access networks (RANs).

An OFDMA network may, for example, implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, LTE is a release of UMTS that uses E-UTRA, UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc, of varying sizes, shapes, and constitution.

FIG. 1 shows wireless network 100 for communication according to some embodiments. While discussion of the technology of this disclosure is provided relative to an LTE-A network (shown in FIG. 1), this is for illustrative purposes. Principles of the technology disclosed can be used in other network deployments, including fifth generation (5G) networks. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Turning back to FIG. 1 wireless network 100 includes a number of base stations, such as may comprise evolved node Bs (eNBs) or G node Bs (gNBs). These may be referred to as gNBs 105. A gNB may be a station that communicates with the UEs and may also be referred to as a base station, a node B, an access point, and the like. Each gNB 105 may provide communication coverage for a particular geographic area. In 3GPP, the term "cell" can refer to this particular geographic coverage area of a gNB and/or a gNB subsystem serving the coverage area, depending on the context in which the term is used. In implementations of wireless network 100 herein, gNBs 105 may be associated with a same operator or different operators (e.g., wireless network 100 may comprise a plurality of operator wireless networks), and may provide wireless communications using one or more of the same frequencies (e.g., one or more frequency band in licensed spectrum, unlicensed spectrum, or a combination thereof) as a neighboring cell.

A gNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A gNB for a macro cell may be referred to as a macro gNB. A gNB for a small cell may be referred to as a small cell gNB, a pico gNB, a femto gNB or a home gNB. In the example shown in FIG. 1, gNBs 105a, 105b and 105c are macro gNBs for the macro cells 110a, 110b and 110c, respectively. gNBs 105x, 105y, and 105z are small cell gNBs, which may include pico or femto gNBs that provide service to small cells 110x, 110y, and 110z, respectively. A gNB may support one or multiple (e.g., two, three, four, and the like) cells.

Wireless network 100 may support synchronous or asynchronous operation. For synchronous operation, the gNBs may have similar frame timing, and transmissions from different gNBs may be approximately aligned in time. For asynchronous operation, the gNBs may have different frame timing, and transmissions from different gNBs may not be aligned in time. In some scenarios, networks may be enabled or configured to handle dynamic switching between synchronous or asynchronous operations.

UEs 115 are dispersed throughout wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a laptop, a personal computer (PC), a notebook, a netbook, a smart book, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copier, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. A mobile apparatus, such as UEs 115, may be able to communicate with macro gNBs, pico gNBs, femto gNBs, relays, and the like. In FIG. 1, a lightning bolt (e.g., communication links 125) indicates wireless transmissions between a UE and a serving gNB, which is a gNB designated to serve the UE on the downlink and/or uplink, or desired transmission between gNBs. Although backhaul communication 134 is illustrated as wired backhaul communications that may occur between gNBs, it should be appreciated that backhaul communications may additionally or alternatively be provided by wireless communications.

Figure 2:
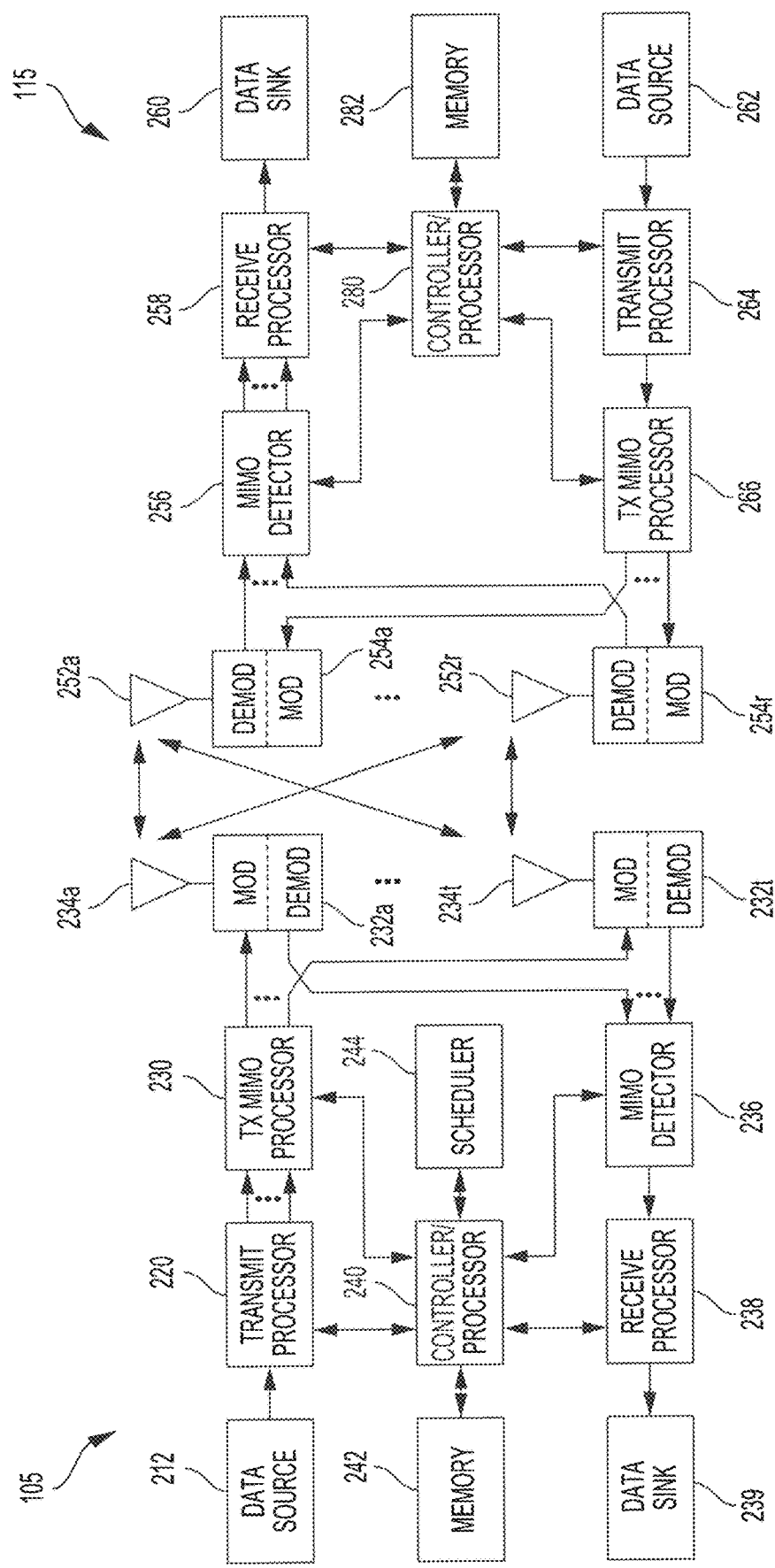
FIG. 2 is a block diagram conceptually illustrating a design of a base station/gNB and a UE configured according to some embodiments of the present disclosure.

FIG. 2 shows a block diagram of a design of base station/gNB 105 and UE 115. These can be one of the base stations/gNBs and one of the UEs in FIG. 1. For a restricted association scenario (as mentioned above), the gNB 105 may be small cell gNB 105z in FIG. 1, and UE 115 may be UE 115z, which in order to access small cell gNB 105z, would be included in a list of accessible UEs for small cell gNB 105z, gNB 105 may also be a base station of some other type. gNB 105 may be equipped with antennas 234a through 234t, and UE 115 may be equipped with antennas 252a through 252r.

At gNB 105, transmit processor 220 may receive data from data source 212 and control information from controller/processor 240. The control information may be for the physical broadcast channel (PBCH), physical control format indicator channel (PCFICH), physical hybrid-ARQ indicator channel) PHICH, physical downlink control channel (PDCCH), etc. The data may be for the physical downlink shared channel (PDSCH), etc, Transmit processor 220 may process (e.g., encode and symbol map) the data and control information to obtain data symbols and control symbols, respectively. Transmit processor 220 may also generate reference symbols, e.g., for the primary synchronization signal (PSS), secondary synchronization signal (SSS), and cell-specific reference signal (CRS). Transmit (TX) multiple-input multiple-output (MIMO) processor 230 may perform spatial processing (e.g., precoding) on the data symbols, the control symbols, and/or reference symbols, if applicable, and may provide output symbol streams to modulators (MODS) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from gNB 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from all demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the PUSCH) from data source 262 and control information (e.g., for the PUCCH) from controller/processor 280. Transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to gNB 105. At gNB 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at gNB 105 and UE 115, respectively. Controller/processor 240 and/or other processors and modules at gNB 105 and/or controllers/processor 280 and/or other processors and modules at UE 115 may perform or direct the execution of various processes for the techniques described herein, such as to perform or direct the execution illustrated in FIGS. 5 and 6, and/or other processes for the techniques described herein. Memories 242 and 282 may store data and program codes for gNB 105 and UE 115, respectively. Scheduler 244 may schedule UEs for data transmission on the downlink and/or uplink.

The present disclosure proposes various procedures that improve retransmission success rate upon failure of a previous transmission. For example, a first proposal involves NACK triggered CSI reporting by a UE to a base station. Additionally, a second proposal involves NACK triggered switch to a different band width part (BWP), control resource set (CORESET), and/or resource block assignment. Also a third proposal involves a NACK triggered SRS transmission.

Regarding the first proposal, a UE automatically transmits a CSI report whenever it transmits a NACK. The proposed procedure is different from current NR PUCCH formats 3 and 4 because these formats only support periodic CSI reporting. As proposed herein, CSI reporting triggered by NACK transmission is a type of aperiodic CSI reporting that can be used instead of or in addition to periodic CSI reporting. For example, a NACK by a UE may always be followed by a CSI report, and the gNB may expect the CSI report from the same UE whenever it receives a NACK from that UE.

The present disclosure envisions three main ways that it may be possible to piggyback CSI with NACK according to the first proposal. A first option is to multiplex a NACK with a CSI in an implicit grant. A second options is to multiplex a NACK with CSI in autonomous uplink (AUL) PUSCH. A third option is to multiplex a NACK with CSI in scheduled uplink (SUL) PUSCH.

According to the first option for the first proposal, NACK triggers transmission of CSI in an implicit grant. For example, through RRC signaling, a gNB may configure a UE with different resource blocks (RBs) for ACK only feedback, and for NACK multiplexed with CSI. A first resource block (RB_ackonly) may be configured for ACK/NACK reporting, and a second resource block (RB_Csi) may be configured for CSI reporting that occurs only when the first resource block contains a NACK. The gNB may assign a same RB_Csi to more than one UE and use DMRS to distinguish different UEs. When a UE only transmits an ACK, it may use RB_ackonly as a normal PUCCH, and when the UE transmits a NACK, it may use RB_ackonly for transmission of the NACK while using RB_Csi to send CSI.

Upon decoding RB_ackonly and determining that it contains a NACK, a gNB may respond by decoding the CSI from RB_Csi. The NACK, thus, implicitly serves as a grant from the gNB to multiplex CSI with the NACK on RB_csi. The gNB may configure these resources via RRC signaling, where RB_Csi is the resource assigned for CSI reporting, and the RRC signaling may indicate a timing offset between transmission of NACK on RB_ackonly and transmission of CSI on RB_csi.

In another implementation of the first option for the first proposal, the UE may be configured to transmit a second copy of the NACK with the CSI. In this case, the RRC signaling may configure the first resource block (RB_ACKonly) and a second resource block (RB_ACKandCSI). As in the first implementation, the second resource block may be configured for more than one UE, and DMRS may be used to identify which UE is transmitting the CSI and the second copy of the NACK. The gNB expects a second copy of the NACK with the CSI, and if it does not find it then the gNB detects an error.

In yet another implementation of the first option for the first proposal, a NACK may trigger transmission of CSI within current PUCCH by using PUCCH format 3 or PUCCH format 4 to multiplex NACK with CSI. In this option, the gNB cannot overprovision a same resource for more than one UE. Also, a change to the operation of PUCCH format 3 and/or PUCH format 4 is necessary to allow these formats to be used to support multiplexing of triggered CSI reporting either instead of or in addition to periodic CSI reporting.

Figure 3A:
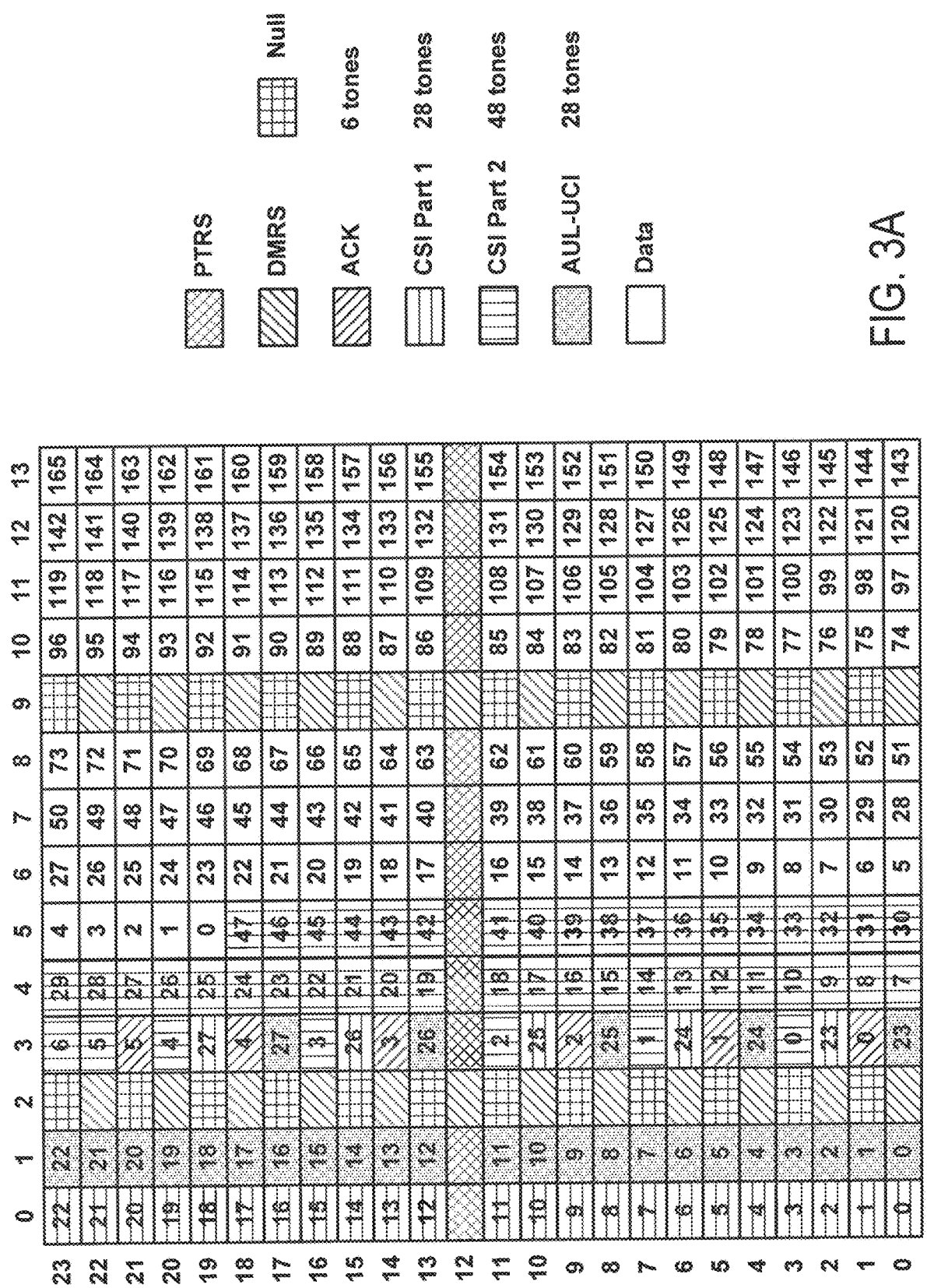
FIG. 3A is a block diagram illustrating multiplexing of a negative acknowledgement (NACK) with channel state information (CSI) in autonomous uplink (AUL) physical uplink shared channel (PUSCH) with data starting at orthogonal frequency division multiplexing (OFDM) symbol number zero according to some embodiments of the present disclosure.
Figure 3B:
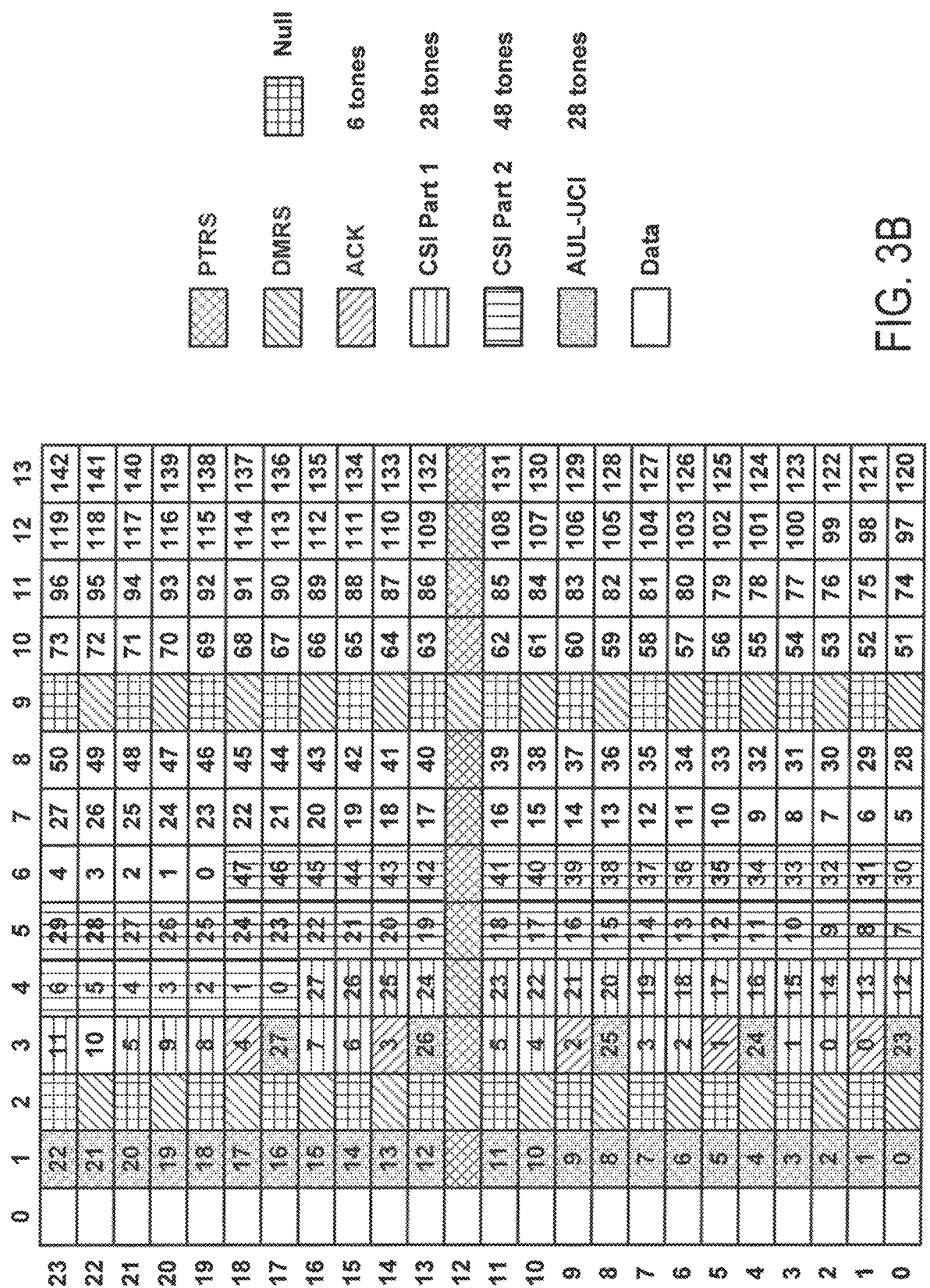
FIG. 3B is a block diagram illustrating multiplexing of NACK with CSI in AUL PUSCH with data starting at OFDM symbol number one according to some embodiments of the present disclosure.

Referring to FIG. 3A, an implementation of the second option for the first proposal involves multiplexing AUL-UCI with NACK, CSI, and data starting at OFDM symbol zero of a subframe. FIG. 3B illustrates another implementation of the second option for the first proposal involves multiplexing AUL-UCI with NACK, CSI, and data starting at OFDM symbol one of a subframe. Here, AUL-UCI transmission is performed with NACK, CSI, and data, and CSI is piggybacked within the earliest AUL subframe. NACK and CSI are also rate matched in the AUL subframe.

Figure 4A:
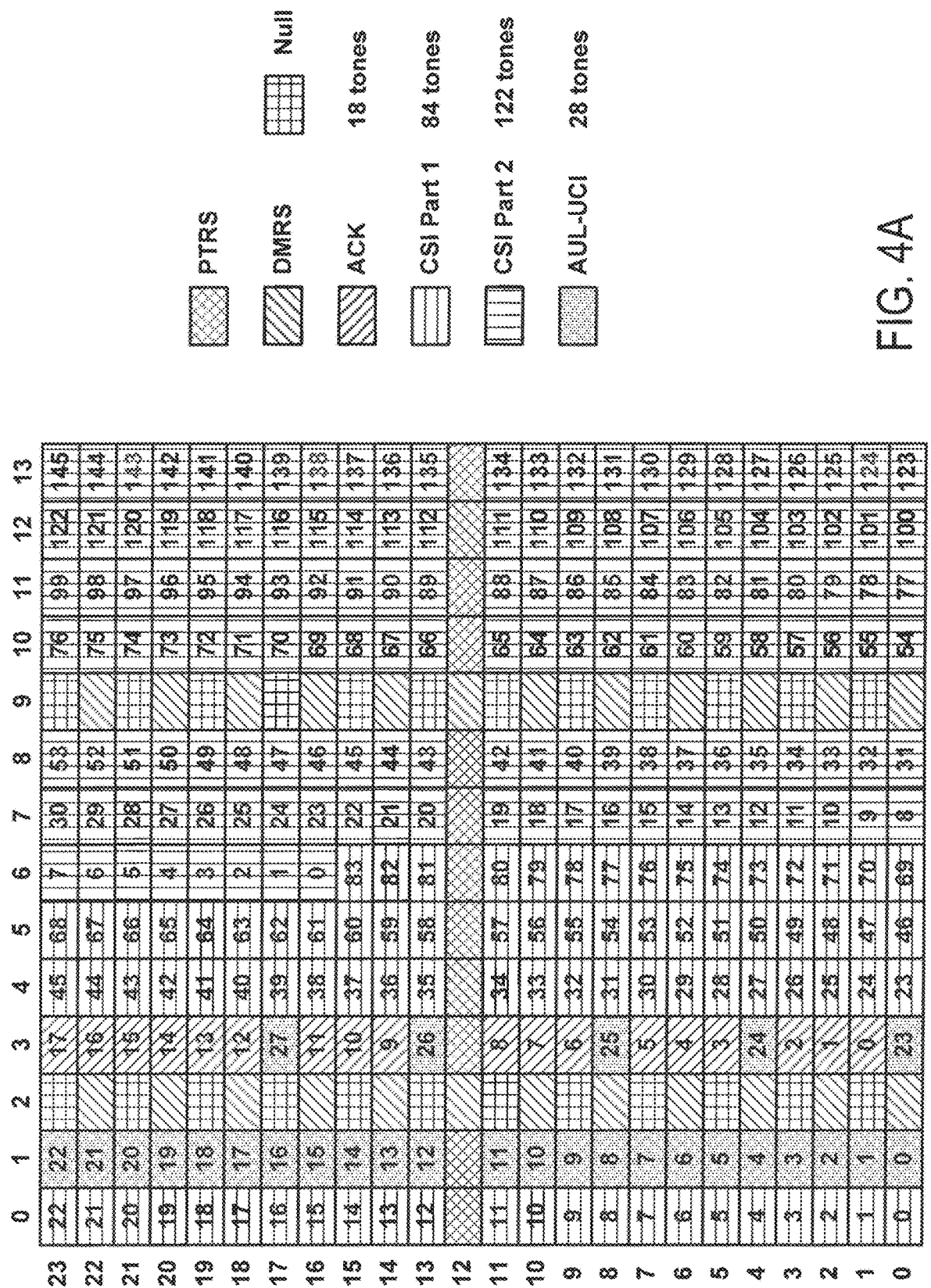
FIG. 4A is a block diagram illustrating multiplexing of NACK with CSI in AUL PUSCH without data starting at OFDM symbol number zero according to some embodiments of the present disclosure.
Figure 4B:
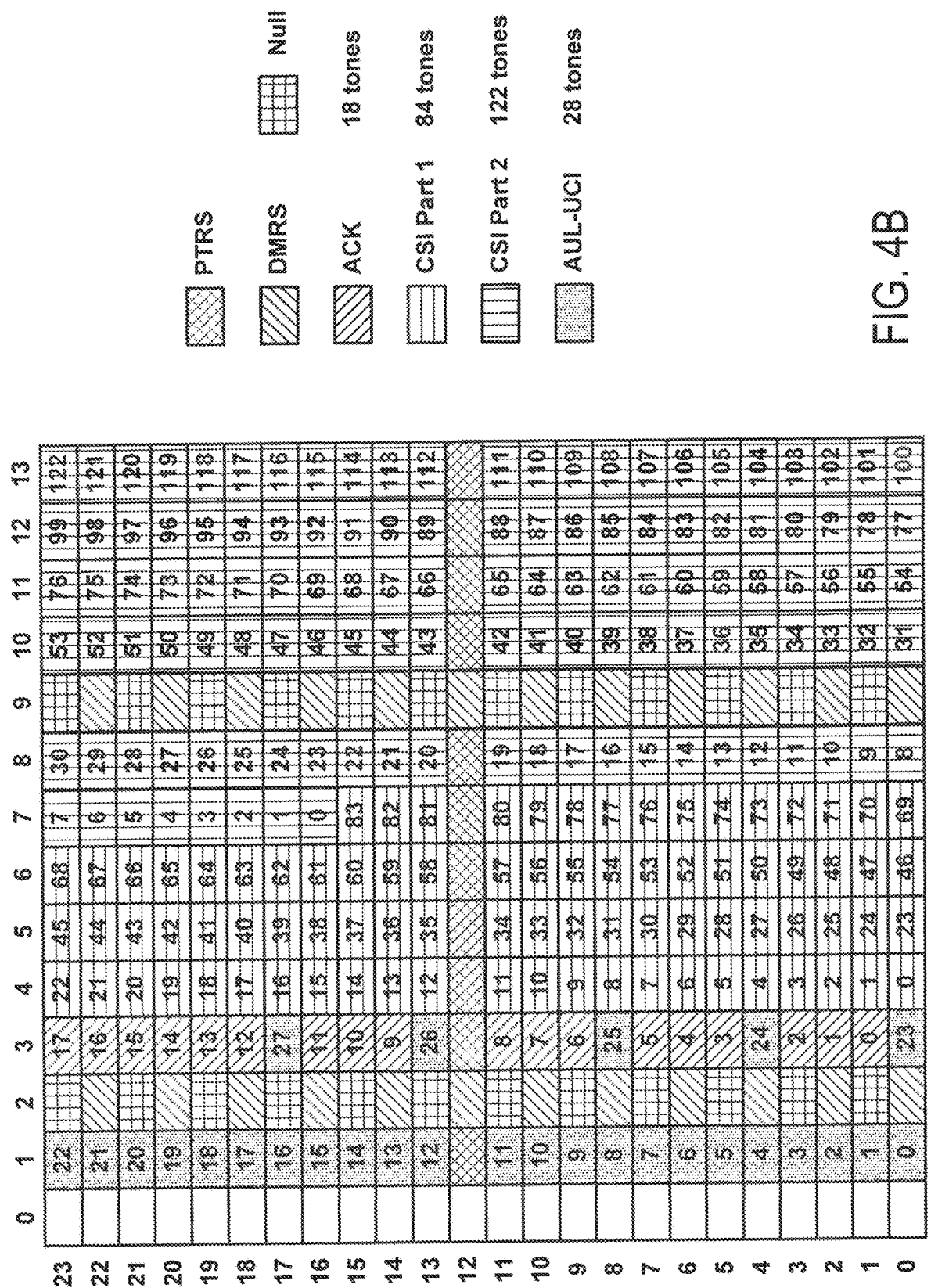
FIG. 4B is a block diagram illustrating multiplexing of NACK with CSI in AUL PUSCH without data starting at OFDM symbol number one according to some embodiments of the present disclosure.

Referring to FIG. 4A, yet another implementation of the second option for the first proposal involves multiplexing AUL-UCI with NACK and CSI, but without data, starting at OFDM symbol zero of a subframe. FIG. 4B illustrates a further implementation of the second option for the first proposal involves multiplexing AUL-UCI with NACK and CSI, but without data, starting at OFDM symbol one of a subframe. Here, AUL-UCI transmission is performed with NACK and CSI only, and without any data.

An implementation of the third option for the first proposal is similar to the second option, but involves multiplexing CSI in SUL PUSCH. In this case, an issue arises if there is no uplink grant, either because there is no uplink data to transmit, or because there is uplink data but the UE did not receive a grant. In the case of no uplink grant, there are three sub-options envisioned for carrying out the third option of the first proposal. For example, the first sub-option is for the UE to piggyback CSI within an earliest SUL subframe and for the gNB to expect the piggybacked CSI in this location in response to receiving the NACK. Additionally, the second sub-option is for the UE to send a scheduling request just to obtain an uplink grant for transmission of CSI. Upon receiving the grant from the base station, the UE may use the grant to transmit the CSI to the base station. Also, the third sub-option is for the gNB to send an uplink grant to the UE automatically upon receiving a NACK. It is envisioned that the gNB may send the uplink grant every time a NACK is received. Alternatively, the gNB may send an uplink grant to the UE in response to a received NACK only if the gNB knows the UE has no uplink grant. In this way, the gNB can avoid sending an uplink grant unnecessarily.

Regarding the second proposal, transmission of NACK by the UE triggers automatic switch to a different BWP, without need for a DCI from the base station to trigger the switch. For example, through RRC signaling, a gNB may configure a UE so that, upon sending out a NACK, the UE should switch to a different BWP at least for the upcoming retransmission. It is envisioned that the RRC signaling may also pre-configure the new BWP by defining a new CORESET and resource block assignment for downlink PDSCH. In some implementations, the different BWP, different CORESET, and/or different resource block assignment may be a larger BWP, a larger CORESET, and/or a larger resource block assignment. A larger CORESET provides for more reliable PDCCH, and a larger resource block assignment provides for more reliable PDSCH. The proposed automatic switch is also faster compared to a DCI based BWP switch.

In some implementations, it is envisioned that the gNB and UE may fall back to the original BWP. For example, after N successful ACKs received by, the gNB, the gNB may transmit a DCI to the UE indicating need to switch back to the original BWP. The UE may also use a MAC-CE as an acknowledgement of the DCI. Alternatively or additionally, a switch back may be automatic after a threshold amount of time that may be configurable by RRC signaling.

Regarding the third proposal, NACK transmission by a UE may automatically trigger SRS transmission by the UE. For example, assuming that the uplink and downlink channels are reciprocal, a UE may piggyback SRS after NACK. The gNB may use the SRS to estimate the uplink channel, and use that estimate for downlink adaptation by assuming the channels are reciprocal.

Figures 5, 6:
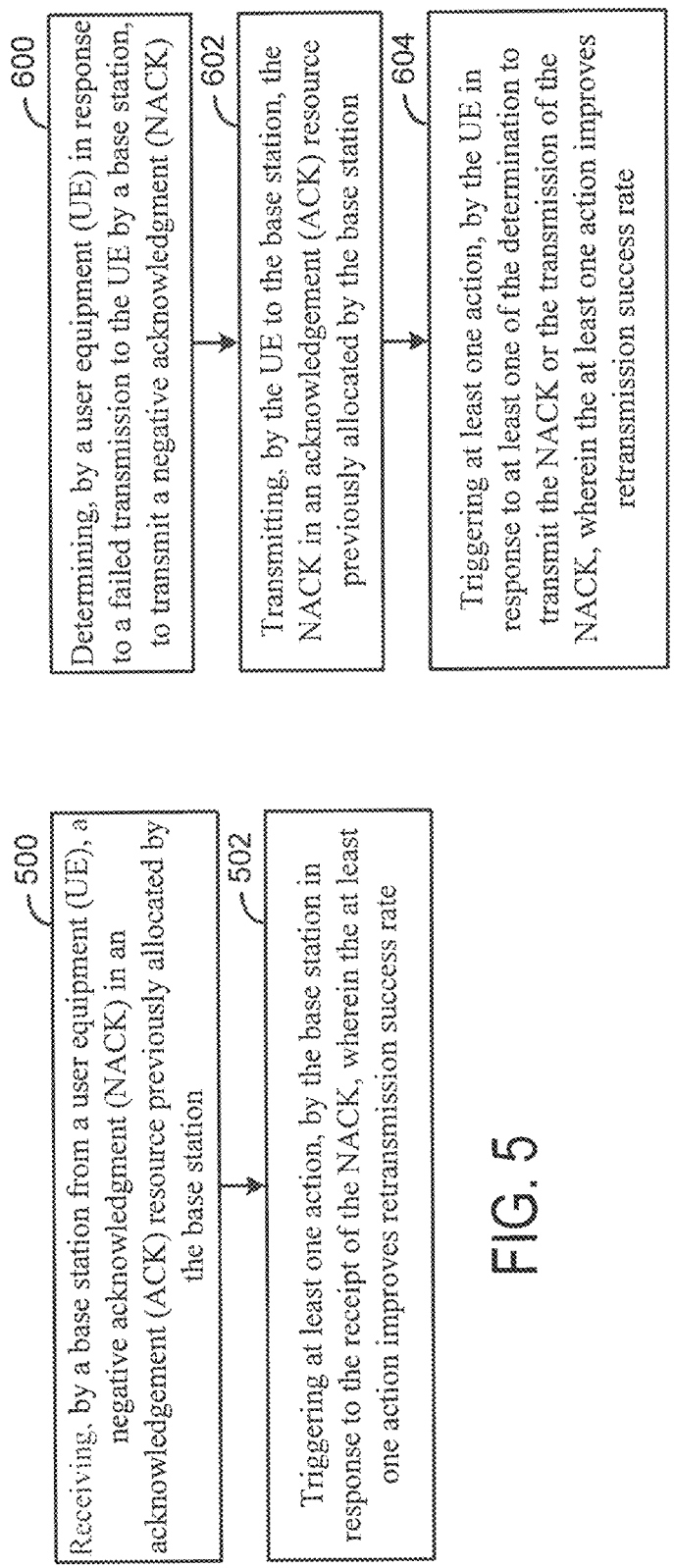
FIG. 5 is a block diagram illustrating example blocks of a wireless communication procedure carried out by a base station configured according to some embodiments of the present disclosure.
FIG. 6 is a block diagram illustrating example blocks of a wireless communication procedure carried out by a user equipment (UR) configured according to some embodiments of the present disclosure.

Referring to FIG. 5, a method of wireless communication begins at block 500. Block 500 entails receiving, by a base station from a user equipment (UE), a negative acknowledgment (NACK) in an acknowledgement (ACK) resource previously allocated by the base station. It is envisioned that block 500 may include decoding an ACK field of a received uplink communication and determining that the ACK field contains a NACK, as opposed to an ACK. Processing may proceed from block 500 to block 502.

Block 502 includes triggering at least one action, by the base station in response to the receipt of the NACK, wherein the at least one action improves retransmission success rate. In some implementations, triggering the at least one action includes receiving, by the base station from the UE, a channel state information (CSI) report multiplexed with the NACK. For example, block 502 may include receiving the CSI report in an implicit grant corresponding to a CSI resource of a physical uplink control channel (PUCCH) that was previously allocated, by the base station via radio resource control (RRC) signaling, for NACK triggered CSI reporting. It is envisioned that this RRC signaling may include a timing offset that specifies a location of the CSI resource with respect to a location of the ACK resource (e.g., a number of resource blocks following the resource block of the ACK resource). It is additionally envisioned that the CSI resource may be allocated to more than one UE, in which case block 502 may include receiving, by the base station from the UE, a demodulation reference signal (DMRS) that at least functions to notify the base station which UE is transmitting the CSI report in the CSI resource. In some additional or alternative implementations, block 502 may include receiving the NACK again, by the by the base station, in the CSI resource.

Alternatively or additionally, receiving the CSI report at block 502 may include receiving the CSI report multiplexed with the NACK in autonomous uplink (AUL) physical uplink shared channel (PUSCH) resources. In such implementations, it is envisioned that receiving the CSI report may include receiving the CSI report multiplexed with AUL uplink control information (UCI), either with or without data. In such implementations, it is additionally envisioned that receiving the CSI report may include receiving the CSI report piggybacked in an earliest AUL subframe, and that the NACK and the CSI report may be rate matched in the earliest AUL subframe.

Alternatively or additionally, receiving the CSI report at block 502 may include receiving the CSI report multiplexed with the NACK in schedule based uplink (SUL) physical uplink shared channel (PUSCH) resources. In such implementations, if the UE lacks an uplink grant for transmission of data, then receiving the CSI report at block 502 may include receiving the CSI report piggybacked in an earliest SUL subframe. Alternatively or additionally, if the UE lacks an uplink grant for transmission of data, then receiving the CSI report at block 502 may include receiving, by the base station from the UE, a scheduling request, and transmitting an uplink grant, by the base station to the UE, in response to the scheduling request. In such implementations, receiving the CSI report at block 502 may include receiving the CSI report in at least one resource allocated by the uplink grant. Alternatively or additionally, if the UE lacks an uplink grant for transmission of data, then block 502 may include transmitting an uplink grant, by the base station to the UE, automatically in response to the NACK, and receiving the CSI report at block 502 may include receiving the CSI report in at least one resource allocated by the uplink grant.

In other implementations, triggering the at least one action at block 502 may include switching, by the base station, to a different IMP, different CORESET, and/or different resource block assignment without transmitting an instruction to the UE to switch to the different BWP, different CORESET, and/or different resource block assignment. It is envisioned that the different BWP, different CORESET, and/or different resource block assignment is preconfigured for the UE by the base station via RRC signaling. In such implementations, it is envisioned that the actions triggered at block 502 may include transmitting an instruction, by the base station to the UE in response to receipt of a predetermined number of ACKs from the UE, in downlink control information. Additional actions triggered at block 502 may include receiving, by the base station from the UE, an acknowledgement of the instruction via a media access control—control element (MAC-CE), and returning to an original BWP, by the base station, in response to receipt of the acknowledgement of the instruction.

In yet other implementations, triggering actions at block 502 may include receiving, by the base station from the UE, a piggybacked transmission of a sounding reference signal (SRS) following receipt of the NACK. In such implementations, actions triggered at block 502 may include employing, by the base station, the SRS to estimate an uplink channel. Yet further actions triggered at block 502 may include using, by the base station, the estimate of the uplink channel for downlink adaptation at least in part by assuming that the uplink channel and the downlink channel are reciprocal.

Referring to FIG. 6, a method of wireless communication begins at block 600. Block 600 entails determining, by a user equipment (UE) in response to a failed transmission to the UE by a base station, to transmit a negative acknowledgment (NACK), Processing may proceed from block 600 to block 602.

Block 602 includes transmitting, by the UE to the base station, the NACK in an acknowledgement (ACK) resource previously allocated by the base station. Processing may proceed from block 602 to block 604.

Block 604 includes triggering at least one action, by the UE in response to at least one of the determination to transmit the NACK or the transmission of the NACK, wherein the at least one action improves retransmission success rate. In some implementations, triggering the at least one action includes transmitting, by the UE to the base station, a channel state information (CSI) report multiplexed with the NACK. For example, block 602 may include multiplexing the CSI report with the NACK by transmitting the CSI report in an implicit grant corresponding to a CSI resource of a physical uplink control channel (PUCCI)). It is envisioned that this CSI resource may have been previously allocated, by the base station via radio resource control (RRC) signaling, for NACK triggered CSI reporting. It is also envisioned that the RRC signaling may include a timing offset that specifies a location of the CSI resource with respect to a location of the ACK resource (e.g., a number of resource blocks following the resource block of the ACK resource). It is further envisioned that the CSI resource may be allocated to more than one UE, in which case block 604 may include transmitting, by the UE to the base station, a demodulation reference signal (DMRS) that functions to notify the base station which UE is transmitting the CSI report in the CSI resource. In additional or alternative implementations, block 604 includes transmitting the NACK again, by the UE, in the CSI resource.

Alternatively or additionally, triggering the one or more actions at block 604 may include multiplexing the CSI report with the NACK in autonomous uplink (AUL) physical uplink shared channel (PUSCH) resources. For example, the CSI report may be multiplexed with AUL uplink control information (UCI), either with or without data. In such implementations, it is envisioned that the multiplexing may include piggybacking the CSI report in an earliest AUL subframe, and/or rate matching the NACK and the CSI report in the earliest AUL subframe.

Alternatively or additionally, it is envisioned that triggering the one or more actions at block 604 may include multiplexing the CSI report with the NACK in schedule based uplink (SUL) physical uplink shared channel (PUSCH) resources. In such implementations, if the UE lacks an uplink grant for transmission of data, then the multiplexing may include piggybacking the CSI report in an earliest SUL subframe in response to the lack of the uplink grant. Alternatively or additionally, if the UE lacks an uplink grant for transmission of data, then actions triggered at block 604 may include transmitting a scheduling request, by the UE to the base station, in response to the lack of the uplink grant, and receiving an uplink grant, by the UE from the base station, in response to the scheduling request. In such cases, the multiplexing may include utilizing the uplink grant to transmit the CSI report. Alternatively or additionally, if the UE lacks an uplink grant for transmission of data, then the one or more actions triggered at block 604 may include receiving an uplink grant, by the UE, that is automatically transmitted by the base station in response to the NACK, and utilizing the uplink grant to transmit the CSI report.

In other implementations, the one or more actions triggered at block 604 may include switching, by the UE, to a different BWP, different CORESET, and/or different resource block assignment without awaiting an instruction from the base station to switch to the different BWP, different CORESET, and/or different resource block assignment. It is envisioned that the different BWP, different CORESET, and/or different resource block assignment may be preconfigured for the UE by the base station via RRC signaling. In such implementations, actions triggered at block 604 may include returning to an original BWP, original CORESET, and/or original resource block assignment, by the UE, in response to an instruction in downlink control information received from the base station, and transmitting, by the UE, an acknowledgement of the instruction via a media access control—control element (MAC-CE).

In yet other implementations, the actions triggered at block 604 may include piggybacking, by the UE, transmission of a sounding reference signal (SRS) following the transmission of the NACK.

Figure 7:
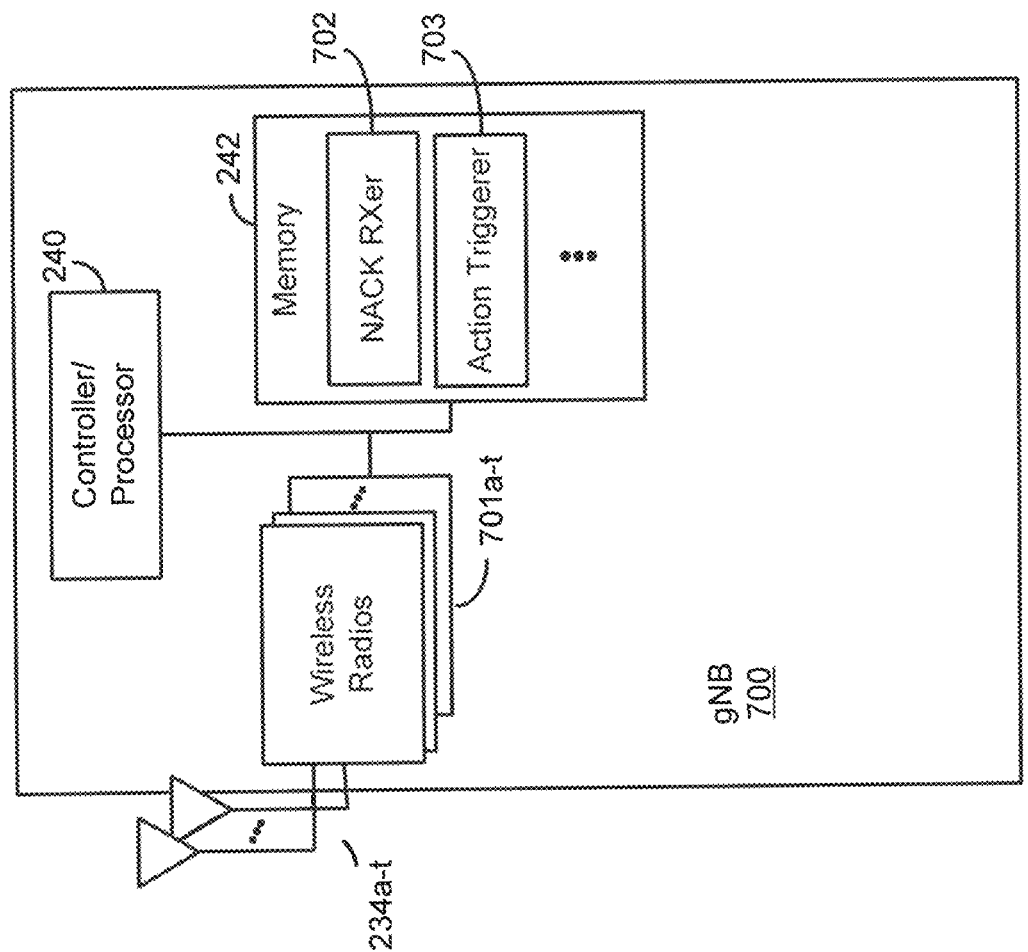
FIG. 7 is a block diagram illustrating a base station configured according to some embodiments of the present disclosure.

Turning now to FIG. 7, a base station 700, such as a NR-SS base station 105 (see FIG. 2), may have a controller/processor 240, a memory 242, and antennas 234a through 234t, as described above. The base station 700 may also have wireless radios 701a to 701t that comprise additional components also described above with reference to FIG. 2. The memory 242 of base station 700 stores algorithms that configure processor/controller 240 to carry out procedures as described above with reference to FIGS. 3-6.

Algorithms stored by memory 242 configure processor/controller 240 to carry out operations relating to wireless communication by the base station 700, as previously described. For example, NACK receiver 702 configures controller processor 240 to carry out operations that include receiving, by the base station 700 from a UE, a NACK in any manner previously described. Additionally, action triggerer 703 configures controller processor 240 to carry out operations that include triggering at least one action, by the base station 700 in response to the receipt of the NACK in any manner previously described.

Figure 8:
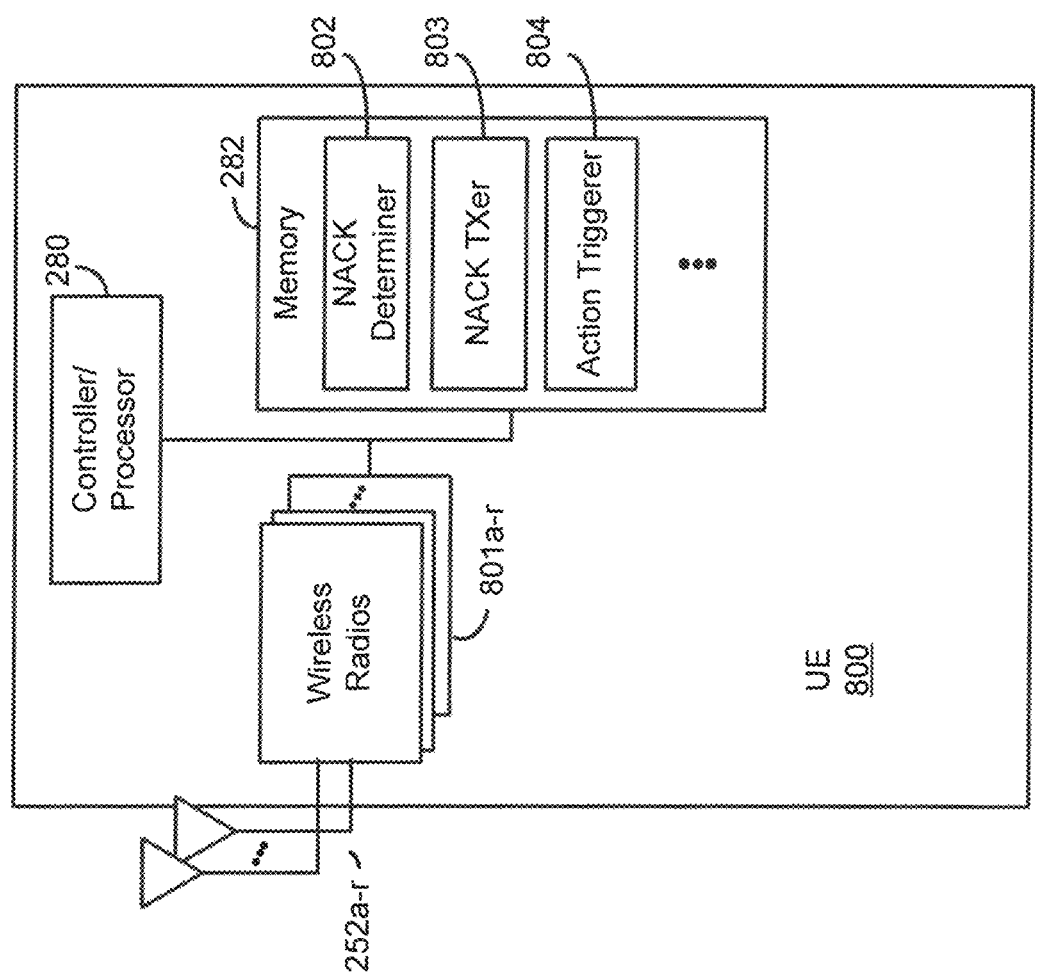
FIG. 8 is a block diagram illustrating a UE configured according to some embodiments of the present disclosure.

Turning now to FIG. 8, a UE 800, such as a UE 115 (see FIG. 2), may have a controller/processor 280, a memory 282, and antennas 252a through 252r, as described above. UE 800 may also have wireless radios 801a to 801r that comprise additional components also described above with reference to FIG. 2. The memory 282 of UE 800 stores algorithms that configure processor/controller 280 to carry out procedures as described above with reference to FIGS. 3-6.

Algorithms stored by memory 282 configure processor/controller 280 to carry out procedures relating to wireless communication by the UE 800, as previously described. For example, NACK determiner 802 configures controller processor 280 to carry out operations that include making a determination to transmit a NACK in any manner previously described. Additionally, NACK transmitter 803 configures controller processor 280 to carry out operations that include transmitting a NACK in any manner previously described. Also, action triggerer 804 configures controller processor 280 to carry out operations that include triggering at least one action, by the UE 800 in response to at least one of the determination to transmit the NACK or the transmission of the NACK in any manner previously described.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIGS. 2 and 5-8) may comprise processors, electronics devices, hardware devices, electronics components, logical circuits, memories, software codes, firmware codes, etc., or any combination thereof.

Those of skill would further appreciate that the various illustrative logical blocks, modifies, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   determining, by a user equipment (UE) in response to a failed transmission to the UE by a base station, to transmit a negative acknowledgment (NACK);
   transmitting, by the UE to the base station, the NACK in an acknowledgement (ACK) resource previously allocated by the base station; and
   triggering at least one action, by the UE in response to at least one of the determination to transmit the NACK or the transmission of the NACK, wherein the at least one action improves retransmission success rate, wherein triggering the at least one action includes switching, by the UE, to a different band width part (BWP) without awaiting an instruction from the base station to switch to the different BWP.

2. The method of claim 1, wherein triggering the at least one action includes:
   transmitting, by the UE to the base station, a channel state information (CSI) report multiplexed with the NACK.

3. The method of claim 2, further comprising at least one of:
    multiplexing the CSI report with the NACK by transmitting the CSI report in an implicit grant corresponding to a CSI resource of a physical uplink control channel (PUCCH);
    multiplexing the CSI report with the NACK in autonomous uplink (AUL) physical uplink shared channel (PUSCH) resources; or
    multiplexing the CSI report with the NACK in schedule based uplink (SUL) physical uplink shared channel (PUSCH) resources.

4. The method of claim 1, wherein the different BWP is preconfigured for the UE by the base station via radio resource control (RRC) signaling.

5. The method of claim 1, further comprising:
    returning to an original BWP, by the UE, in response to an instruction in downlink control information received from the base station; and
    transmitting, by the UE, an acknowledgement of the instruction via a media access control-control element (MAC-CE).

6. The method of claim 1, wherein triggering the at least one action further includes:
    switching, by the UE, to a different control resource set (CORESET) without awaiting an instruction from the base station to switch to the different CORESET.

7. The method of claim 1, wherein triggering the at least one action includes:
    switching, by the UE, to a different control resource set (CORESET) without awaiting an instruction from the base station to switch to the different CORESET.

8. The method of claim 7, wherein the different CORESET is preconfigured for the UE by the base station via radio resource control (RRC) signaling.

9. An apparatus configured for wireless communication, the apparatus comprising:
    at least one processor; and
    a memory coupled to the at least one processor;
    wherein the at least one processor is configured:
        to determine, by a user equipment (UE) in response to a failed transmission to the UE by a base station, to transmit a negative acknowledgment (NACK);
        to transmit, by the UE to the base station, the NACK in an acknowledgement (ACK) resource previously allocated by the base station; and
        to trigger at least one action, by the UE in response to at least one of the determination to transmit the NACK or the transmission of the NACK, wherein the at least one action improves retransmission success rate, wherein the configuration of the at least one processor to trigger the at least one action includes configuration of the at least one processor to switch, by the UE, to a different band width part (BWP) without awaiting an instruction from the base station to switch to the different BWP.

10. The apparatus of claim 9 wherein the different BWP is preconfigured for the UE by the base station via radio resource control (RRC) signaling.

11. The apparatus of claim 9, wherein the at least one processor is further configured:
    to return to an original BWP, by the UE, in response to an instruction in downlink control information received from the base station; and
    to transmit, by the UE, an acknowledgement of the instruction via a media access control-control element (MAC-CE).

12. The apparatus of claim 9, wherein the configuration of the at least one processor to trigger the at least one action includes configuration of the at least one processor:
    to switch, by the UE, to a different control resource set (CORESET) without awaiting an instruction from the base station to switch to the different CORESET.

13. The apparatus of claim 9, wherein the configuration of the at least one processor to trigger the at least one action includes configuration of the at least one processor:
    to switch, by the UE, to a different control resource set (CORESET) without awaiting an instruction from the base station to switch to the different CORESET.

14. The apparatus of claim 13, wherein the different CORESET is preconfigured for the UE by the base station via radio resource control (RRC) signaling.

15. A method of wireless communication, comprising:
    receiving, by a base station from a user equipment (UE), a negative acknowledgment (NACK) in an acknowledgement (ACK) resource previously allocated by the base station; and
    triggering at least one action, by the base station in response to the receipt of the NACK, wherein the at least one action improves retransmission success rate, wherein triggering the at least one action includes switching, by the base station, to a different band width part (BWP) without transmitting an instruction to the UE to switch to the different BWP.

16. The method of claim 15, wherein the different BWP is preconfigured for the UE by the base station via radio resource control (RRC) signaling.

17. The method of claim 15, further comprising:
    transmitting an instruction, by the base station to the UE in response to receipt of a predetermined number of ACKs from the UE, in downlink control information;
    receiving, by the base station from the UE, an acknowledgement of the instruction via a media access control-control element (MAC-CE); and
    returning to an original BWP, by the base station, in response to receipt of the acknowledgement of the instruction.

18. The method of claim 15, wherein triggering the at least one action further includes:
    switching, by the base station, to a different control resource set (CORESET) without transmitting an instruction to the UE to switch to the different CORESET.

19. The method of claim 15, wherein triggering the at least one action includes:
    switching, by the base station, to a different control resource set (CORESET) without transmitting an instruction to the UE to switch to the different CORESET.

20. The method of claim 19, wherein the different CORESET is preconfigured for the UE by the base station via radio resource control (RRC) signaling.

21. An apparatus configured for wireless communication, the apparatus comprising:
    at least one processor; and
    a memory coupled to the at least one processor;
    wherein the at least one processor is configured:
        to receive, by a base station from a user equipment (UE), a negative acknowledgment (NACK) in an acknowledgement (ACK) resource previously allocated by the base station; and
        to trigger at least one action, by the base station in response to the receipt of the NACK, wherein the at least one action improves retransmission success rate, wherein the configuration of the at least one processor to trigger the at least one action includes configuration of the at least one processor to switch, by the base station, to a different band width part (BWP) without transmitting an instruction to the UE to switch to the different BWP.

22. The apparatus of claim 21, wherein the different BWP is preconfigured for the UE by the base station via radio resource control (RRC) signaling.

23. The apparatus of claim 21, wherein the at least one processor is further configured:
- to transmit an instruction, by the base station to the UE in response to receipt of a predetermined number of ACKs from the UE, in downlink control information;
- to receive, by the base station from the UE, an acknowledgement of the instruction via a media access control-control element (MAC-CE); and
- to return to an original BWP, by the base station, in response to receipt of the acknowledgement of the instruction.

24. The apparatus of claim 21, wherein the configuration of the at least one processor to trigger the at least one action includes configuration of the at least one processor:
- to switch, by the base station, to a different control resource set (CORESET) without transmitting an instruction to the UE to switch to the different CORESET.

25. The apparatus of claim 21, wherein the configuration of the at least one processor to trigger the at least one action includes configuration of the at least one processor:
- to switch, by the base station, to a different control resource set (CORESET) without transmitting an instruction to the UE to switch to the different CORESET.

26. The apparatus of claim 25, wherein the different CORESET is preconfigured for the UE by the base station via radio resource control (RRC) signaling.

* * * * *